Sept. 22, 1953        S. P. KISH        2,652,595
METHOD OF MAKING INDUSTRIAL MODELS AND FIXTURES
Filed Jan. 24, 1950        3 Sheets-Sheet 1
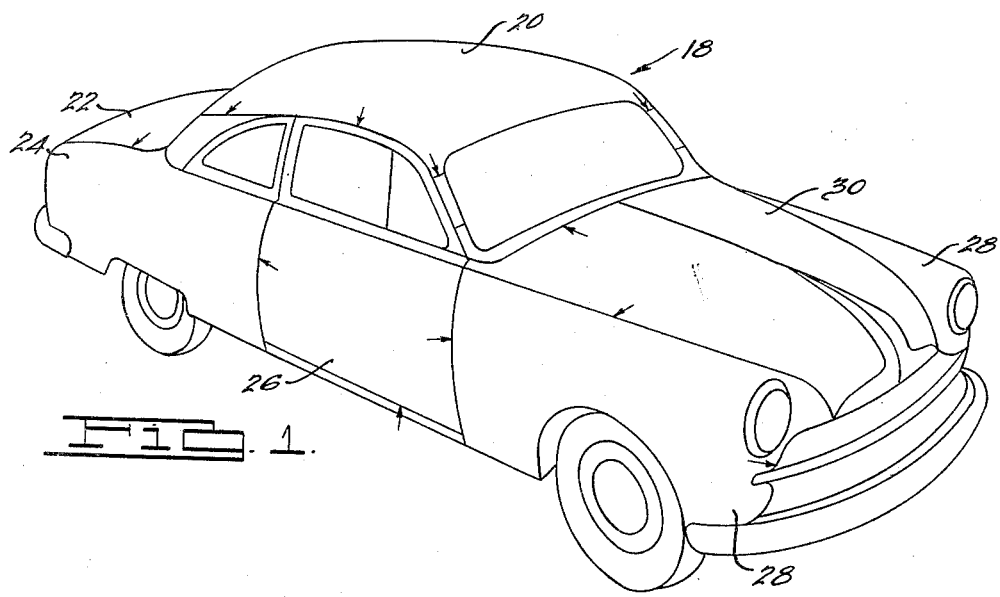
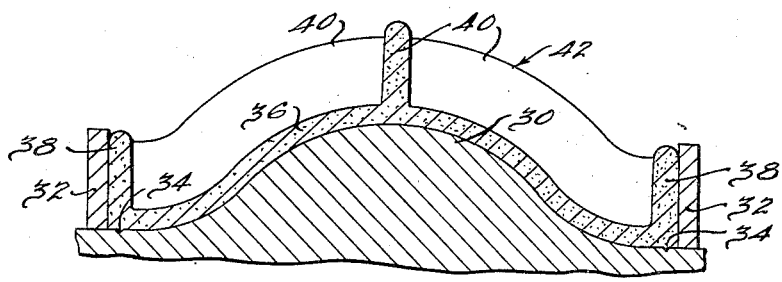
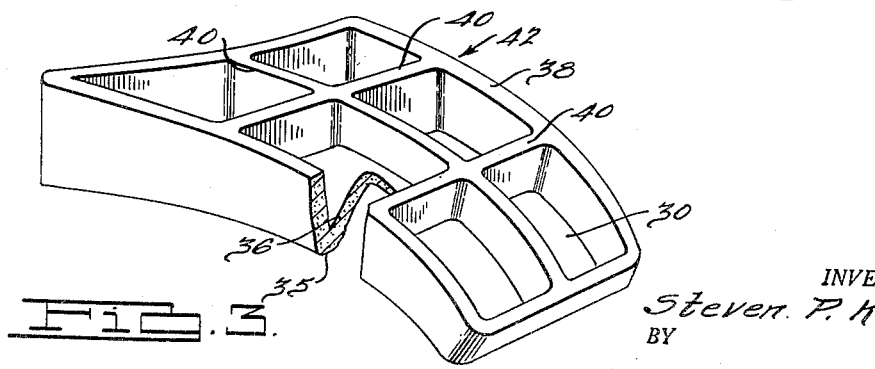
INVENTOR.
Steven P. Kish.
BY
Harness, Dickey & Pierce
ATTORNEYS Sept. 22, 1953  S. P. KISH  2,652,595
METHOD OF MAKING INDUSTRIAL MODELS AND FIXTURES
Filed Jan. 24, 1950  3 Sheets-Sheet 2

INVENTOR.
Steven P. Kish.
BY
Harness, Dickey & Pierce.
ATTORNEYS.

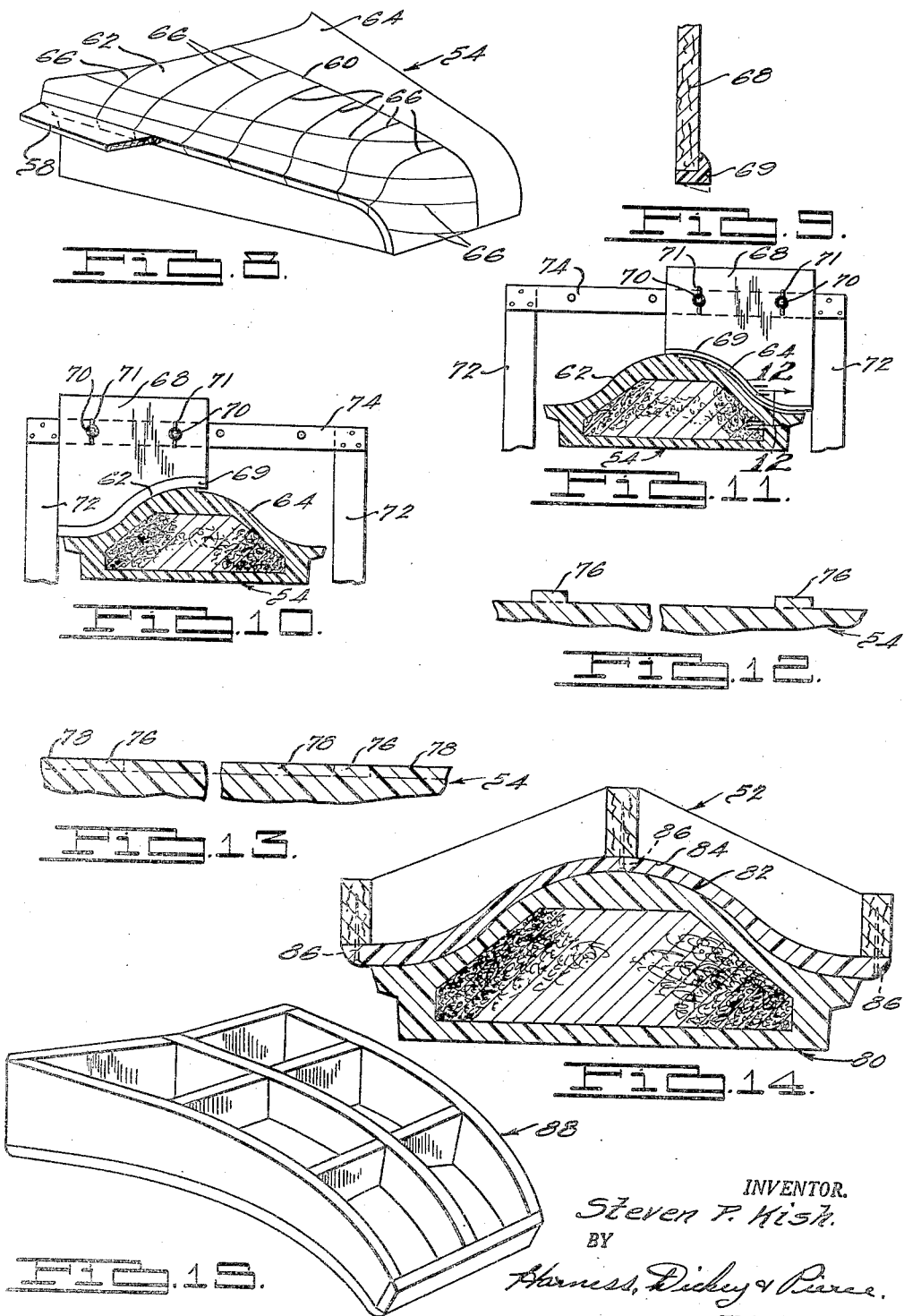

Patented Sept. 22, 1953

2,652,595

UNITED STATES PATENT OFFICE 2,652,595

METHOD OF MAKING INDUSTRIAL MODELS AND FIXTURES

Steven P. Kish, Lansing, Mich., assignor to Kish Plastic Products, Inc., Lansing, Mich., a corporation of Michigan Application January 24, 1950, Serial No. 140,334

13 Claims. (Cl. 18—47.5)

This invention relates broadly to the manufacture of industrial models, tools and fixtures.

The invention is primarily intended and preeminently suited for the automobile industry in tooling up for model change-overs. The procedures herein described greatly facilitate manufacture of tools conventionally used in the manufacture of dies and for checking parts produced by the dies. Actual tests have demonstrated that the procedures embodying this invention greatly reduce tooling costs as compared with generally accepted methods. Perhaps even more important to the industry, however, is the fact that the time required for tooling up is reduced to a fraction of the time heretofore required.

It should be understood in this connection that, although the invention is primarily adapted for use by automobile industry, it can be used in any capacity where it has utility. Considered broadly, the procedures hereinafter set forth can be used in the manufacture of any device having a formed metal body, housing, or cabinet wherein the individual metal parts are made by stamping, forming, or drawing. It is appreciated that the invention is not limited to the automobile industry and it is not intended that the invention be so restricted. For convenience, however, the invention is described herein as it pertains to the automobile industry. Other applications will be apparent to those skilled in the art.

In the automobile industry the production of a new body style involves a number of expensive tooling operations. Usually the first step is to prepare artists' sketches or drawings which depict the new style. Also, fractional size clay models may be made which show the new style in three-dimensional form. A full-size styling model or dummy is then made. Usually the styling model is made of clay, but other materials such as wood, plaster, or plastic material of one kind or another may also be employed. At the same time the full-scale model is made, styling drawings and body drafts also are made which show the complete outline form of the body, the shape and location of window glass, seating arrangements etc., as well as joint and high-light lines which show how the various skin panels intersect and fit together.

Heretofore it has been customary for body designers working from the styling model to make a full set of drawings showing the complete surface and details of construction. This phase of the preparation usually required from eight to twelve mounths. Die-model makers working from these drawings then produce the master die models from mahogany by hand methods. These operations usually took another six to eight months. These master models are very valuable and are therefore used only for reference purposes. In addition, it is necessary to have tools for various purposes which accurately represent the surfaces shown in original form on the master model. Thus, it is necessary to have die models for use in the machining of the production dies. It is necessary to have checking fixtures for inspecting the mass-produced parts, as well as to protect the production dies. In some cases it may be necessary to have hammer forms to assist in the actual manufacture of the production parts. These and other tools usually referred to as reproduction fixtures are prepared from the master model by conventional methods least likely to injure the master. All in all it has usually taken at least a year and a half from the time the artist sketches were made to the time the reproduction fixtures were completed and actual production of the model could be started.

In a highly competitive industry such as the one here under consideration, time is of the essence and many efforts have been made without real or spectacular success to shorten the time required for tooling up. Also it will be readily apparent that the amount of labor and actual cost involved in the production of these models, drawings, and fixtures represents a tremendous investment by the manufacturer which in turn is necessarily reflected in the cost of the final product.

An important object of the present invention is to provide an improved procedure which will permit a master model and all reproduction fixtures to be completed within a matter of weeks from the time the clay styling model is completed and approved.

Another object of the invention is to provide a procedure for making industrial models by means of which a plurality of identical master models can be made for distribution to different key departments, which models are adequately strong and are dimensionally more stable than the mahogany models currently used.

Still another object of the invention is to provide a novel procedure that will greatly reduce the time required for making master models and female reproductions thereof from the styling dummy and which entirely eliminates hand-carving models from mahogany as well as other expensive and time-consuming operations heretofore deemed necessary.

Yet another object of the invention is to provide a unique procedure wherein master models of parts having bilaterally symmetrical portions or surfaces can be made exactly symmetrical from the styling dummy even though the latter may be imperfect in this respect.

A further object of the invention is to provide a method of making industrial models and fixtures that will not only shorten the time required to tool up but that will materially reduce cost and labor required by conventional methods.

Other objects and advantages of the invention will be apparent during the course of the following description.

In the drawings forming a part of this specification and wherein like numerals are employed to designate like parts of the same:

Fig. 1 is a perspective view showing a styling model of an automotive vehicle and illustrating the manner in which the major skin panels are marked off on the model;

Fig. 2 is a transverse sectional view through the hood portion of the styling model showing the manner in which a plaster mold is made of the hood panel as a preliminary step in the method embodying the present invention;

Fig. 3 is a perspective view of the plaster mold produced as shown in Fig. 2;

Fig. 8 is a perspective view of the plastic male model duplication and illustrating the manner in which the outline of the same is shaped by templates made from conventional body drafts;

Fig. 9 is a transverse, sectional view through a template made as a subsequent step of the instant method;

Fig. 10 is a transverse, sectional view showing the template applied to one side of the plastic male model duplication;

Fig. 11 is a view similar to Fig. 10 but showing the template reversed as a step in making the two halves of the duplication symmetrical;

Fig. 12 is a fragmentary, longitudinal, sectional view taken on the line 12—12 of Fig. 11;

Fig. 13 is a view similar to Fig. 12 but showing a subsequent step in making the halves of the duplication symmetrical;

Fig. 14 is a view showing the manner in which a female reproduction of the master male model or duplication is made using the open lattice framework previously referred to; and Fig. 15 is a perspective view of the plastic female reproduction.

Figure 4:
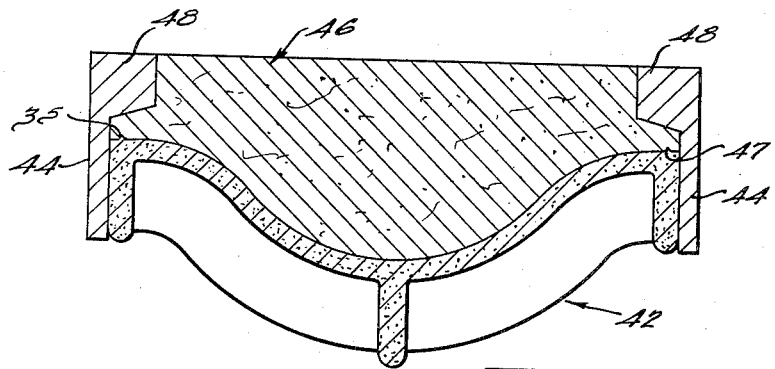
Fig. 4 is a transverse sectional view showing the manner in which a plaster male cast is made from the female mold as a further step of the method embodying the invention.

For a detailed description of the invention reference is now had to the accompanying drawings wherein Fig. 1 shows a conventional styling dummy or model 18 of an automobile body. As suggested, the styling model can be made of any suitable material such as wood, clay, or plastic; however, it usually is made of clay by hand methods directly from artists' sketches. A full-size clay model is here shown, and the various skin panels are marked off by joint lines scored into the clay surface of the model. The skin panels shown in the illustration are the roof panel 20, deck panel 22, rear quarter panel 24, door panel 26, front fender panels 28, and the hood panel 30. The joint lines which separate and delineate the several panels 20—30 are designated by arrows in Fig. 1. It will be readily appreciated in this connection that the two sides of the car are identical and that there are corresponding side panels on opposite sides of the model.

According to the present invention plaster molds are made of the major skin panels 20—30 directly from the clay styling dummy. Identical procedures are used for each panel and a detailed description of one therefore will suffice. The hood panel 30 is selected as representative.

To make a plaster mold of the hood panel 30, the latter is boxed in in any suitable manner. Temporary walls are erected on the styling model outside the joint lines which define the hood, and plaster is poured into the cavity thus formed. In the drawings (Fig. 2) I have shown fiberboard walls 32 set up on the styling model slightly outside the joint slides 34. The walls 32 are first shaped to conform generally to the surface of the model and are then set edgewise thereon, as illustrated, to fully enclose the panel. The walls 32 can be held in place and suitably fastened to each other in any suitable manner. A layer of plaster 36 is then applied to the surface of the model within the walls 32. Also, the plaster preferably is built up along the inner sides of the walls 32 to provide upstanding peripheral walls 38 as well as in transverse ridges between the walls 38 to provide strengthening and reinforcing webs 40. Any suitable or conventional plaster may be used. Preferably asbestos or other suitable binder is incorporated in the plaster to give it requisite strength and moldability. After the plaster has set or hardened, walls 32 are removed, and the finished mold 42 is removed from the styling model. A perspective view of the finished hood mold is shown in Fig. 3 of the drawings. It will be readily apparent that the inside or undersurface of the mold accurately reproduces the clay surface of the styling model and that the joint lines 34 are reproduced in the form of slight ridges 35 in the surface of the mold.

Figure 5:
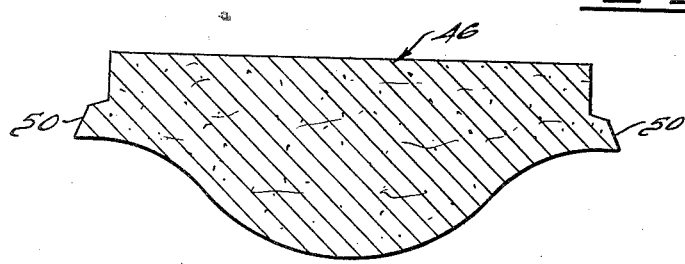
Fig. 5 is a transverse sectional view of the plaster male cast after it has been properly trimmed to the joint lines of the part.

The plaster mold 42 is then inverted and side walls 44 are built up around the periphery thereof. Although only two side walls 44 are here shown, it will be understood that all four sides of the mold are enclosed to produce a cavity for making a plaster cast of the part here under consideration. When the side walls 44 are properly assembled on the mold 42, the cavity is filled with plaster to produce the cast 46 (Fig. 5). After the plaster has set, the side walls 44 are removed from the mold 42 and the cast 46 is separated from the mold. Manifestly the joint lines 35 are reproduced negatively as score marks 47 in the reproducing surface of the cast 46. After the cast 46 has been separated from the mold, the side edges thereof are trimmed flush with the joint lines 47 as the cast is to be used for fabricating framework, and outline of frames for tools and fixtures which are made by subsequent steps of the instant method. Preferably, the portions of side walls 44 which project above the mold 42 are thickened, as at 48, to reduce the amount of material that must be trimmed from the cast 46. The trimmed edges of the cast are designated by the numeral 50.

Figure 6:
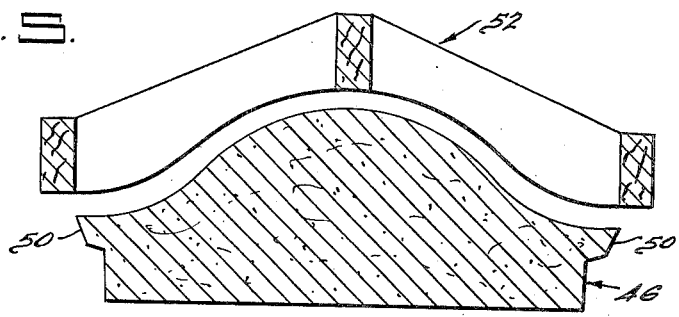
Fig. 6 is a transverse, sectional view showing the manner in which an open, lattice framework to be used in a subsequent operation is fashioned on the male plaster cast.

After the trimming operation is completed the cast 46 is inverted, as shown in Fig. 6, and used as a model for making a reinforcing and outline frame as described above. A lattice framework or "egg crate" 52 is shown by way of illustration, and this frame is intended for use as a reinforcement for a female reproduction of the master male model produced by a subsequent operation. The reinforcing framework 52 preferably is made of wood, although it is contemplated that any suitable material may be used for this purpose.

Figure 7:
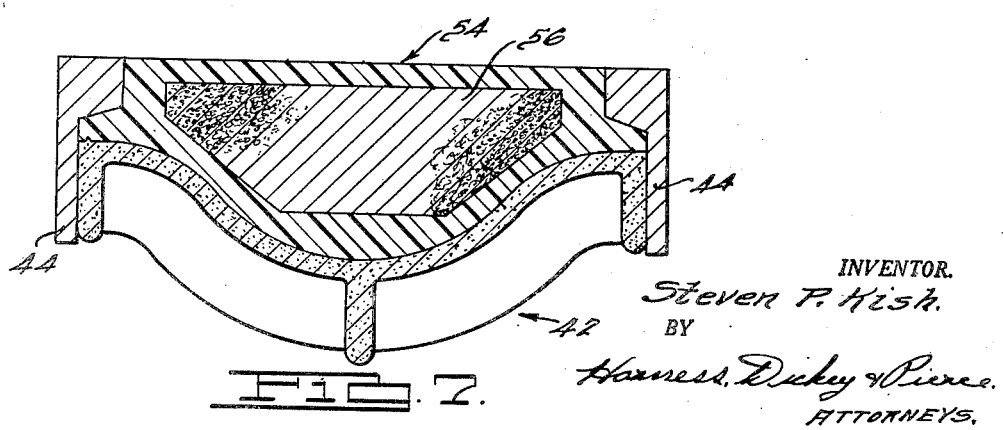
Fig. 7 is a transverse, sectional view showing a subsequent step in the method wherein a plastic male model duplication is made of the plaster cast.

After the plaster cast 46 has been removed from the mold 42, the side walls 44 are reassembled on the mold, as shown in Fig. 7. A plastic cast 54 is then made from the mold, which cast is a duplicate of the plaster cast 46 and accurately reproduces the hood panel 30 of the styling model 18. Any suitable conventional plastic material can be used for the cast 54. Materials having the properties of urea formaldehyde or phenol formaldehyde resins have been found to be particularly desirable. These materials produce unusually good results when used with a core 56 formed of expanded polystyrene. In making the cast 54, the procedures and materials recommended in my copending application Serial No. 66,886 filed December 23, 1948, preferably are employed. Manifestly the plastic cast 54 is a male model duplication of the part being reproduced, and it can be removed from the mold as soon as the plastic material has hardened or set. A perspective view of the finished duplication is shown in Fig. 8 of the drawings.

While the male model duplication 54 reproduces exactly the corresponding portion of the styling model, it is not a finished form from which tools and fixtures can be made. The two sides of the top surface are not precisely symmetrical and surface marks and blemishes on the clay model are reproduced on the surface of the plastic male model duplication. Also, the clay styling model is likely to be wavy or uneven, and these irregularities are reproduced on the plastic duplication. The important thing is, however, that the surface of the clay model has now been duplicated in a form which is dimensionally stable and relatively permanent. Moreover, the reproduction is from a material that can be readily worked with conventional tools, and various parts or areas of the model can be built up by using additional plastic material as required. If materials of the type hereinabove recommended are used, the added plastic material bonds securely to the base material to form an integral one-piece unit, the added or "patched" areas will not thereafter split, separate, or foliate, and a truly integral one-piece construction is obtained as a final product.

The first step in shaping the rough male model duplication 54 is to shape the edges and profile surfaces along all joint and high-light lines, using templates which are prepared in the conventional manner from body drafts. The latter usually are made at the same time or about the same time as the styling model 18. A fragmentary portion of an outline or joint template 58 is shown in Fig. 8. The templates 58 conventionally are made of sheet aluminum and they may be mounted for shaping the body in the model 54 in any desired manner. Usually the duplication 54 is divided by a longitudinal center line 60 into two bilaterally symmetrical halves 62 and 64. The center line 60 is made relatively permanent as by scoring or the like. A suitable jig (not shown) is then made which supports the templates 58 properly with respect to the center line of the model, and the edge of the latter is trimmed by a conventional shaper using the edge of the template as a pattern. Accurate trimming of the duplication 54 is necessary to insure a proper fit between panels made from the model and adjoining panels which are made in a similar manner.

After the male model duplication 54 has been properly conformed to the joint and high-light templates, one half of the duplication is worked out by hand methods to a desired final shape. In the drawings I have shown the side 62 worked out in this manner. In working out the model, parts of the plastic material are cut away, if necessary, and parts are built up, using additional plastic material in the manner hereinabove described. This can be done very easily as the plastic material can be cut readily by conventional tools, and added plastic material bonds perfectly to the base material. Also, the plastic can be easily shaped before it hardens and it can be set or hardened in a matter of minutes. After the surface 62 has been worked out and smoothed to the final shape, transverse and longitudinal scribe lines 66 are impressed on or scored into the finished surface. These lines may be spaced any desired distance apart. The spacing in any particular instance will vary considerably, depending on the particular shape of the model. In most instances the lines are spaced approximately five inches apart. The scribe lines 66 serve as guides for making templates which are used to make the other half 64 conform to the finished part 62.

A separate template is made for each of the scribe lines 66. These templates can be made in any desired manner, but they preferably are made as described in my copending application Serial No. 140,333 which was filed on the 24th day of January 1950 now Patent No. 2,621,366. A finished template of this type is shown in Fig. 9 of the drawings and comprises a backing strip 68 of sheet metal, fiberboard or the like having a plastic facing 69 which exactly reproduces the surface of the model at its respective scribe line.

The templates can be supported in any suitable manner on the male model duplication 54. In Fig. 10 I show a template fastened by bolts 70 and wing nuts 71 to a suitable framework which comprises upright members 72 and a transverse member 74. The framework here shown straddles the entire male model duplication 54 and has provision for fastening the templates either in the position shown in Fig. 10 or in the position shown in Fig. 11. In Fig. 10 the template is shown in one position over the sides 62 of the duplication 54, and in Fig. 11 the template is shown in reverse position over the side 64 thereof. In any event, after the templates have been made, they are repositioned in corresponding positions above the unfinished surface of part 64 and in identical relationship with respect to the unfinished part. If any part of the model interferes with positioning the templates in the manner described it can be easily and quickly removed by means of a suitable routing or planing tool or the like.

After the templates have been repositioned as shown in Fig. 11, the unfinished part 64 is built up with plastic material under the templates until the built-up portions mate exactly with the confronting undersurfaces of the template. This is best accomplished by blanking off the spaces between the templates and the surface of the duplication 54 and then filling the intervening space with plastic material. After the templates are removed from the duplication 54, the unfinished side 64 of the latter is left with a plurality of spaced, parallel ridges 76 having top surfaces which conform exactly with corresponding portions of the finished surface 62.

The next step is to fill in between ridges 76 with additional plastic material 78, as shown in Fig. 13. The plastic material 78 is then worked out, using the ridges 76 as references or indexes until such portions conform to corresponding portions of the finished surface 62. When this operation is completed, the two halves 62 and 64 of the duplication 54 are symmetrical and a master male model 80 has been produced. A sectional view of the finished model is shown in Fig. 14.

In connection with the foregoing it will be readily appreciated that similar procedures are followed for the top and deck panels 20 and 22. Also, analogous procedures are followed for the right- and left-hand rear-quarter panels 24, right- and left-hand door panels 26, and right- and left-hand fender panels 28. In these latter panels one panel is finished in the same manner as the side 62 of the hood panel and the other side is then conformed in the same manner as side 64 of the hood panel. Analogous procedures are employed throughout.

After the master model 80 is completed, a plastic female reproduction preferably is made using the lattice frame 52 hereinabove described. To make the female reproduction the framework 52 is suspended above and spaced from the top surface 82 of the male model 80 and plastic material 84 is then applied to the surface 82. Alternatively, of course, the plastic material can be paddled on or otherwise applied to the surface 82 and the frame 52 then set on and suitably fastened to the plastic layer. In the form of the invention here shown by way of illustration the plastic layer 84 is fastened to the frame 52 by headed nails 86 which are embedded in and project downwardly from the frame. As soon as the plastic layer 84 has set or hardened, the female reproduction 88 may be removed from the master model 80. The finished female reproduction is shown in Fig. 15 of the drawings.

Suitable tools and fixtures can then be made from the master male model 80 and the female reproduction 88 thereof according to conventional practice or preferably as shown in my co-pending application Serial No. 69,952 filed January 8, 1949, and Serial No. 118,113 filed September 27, 1949.

In addition to the above, the female reproduction 88 can be used as a mold for making additional or duplicate sets of plastic die or master models. Duplicate sets of the master model are desirable in most instances for distribution to different engineering departments. For example, a master male model can be used to advantage for making necessary checking fixtures required in panel checking for production, as well as by the engineering department and die shops for hole layout and contour checks and for setting up jigs and fixtures for production body fabrication. It will be readily appreciated in this connection that master models made by hand methods from mahogany according to conventional practice could not be reproduced or duplicated in the same manner as a master model made according to the instant invention. As a result, a great many complications are obviated by this invention. Heretofore only a master model was produced and this model had to serve all departments. In most instances the wooden master model was not dimensionally stable and since it was fabricated from a plurality of pieces glued together it frequently began to break apart or to distintegrate either as a result of excessive handling and use or as a result of exposure to excessive dampness, unfavorable temperatures or other conditions.

From the foregoing it will be readily apparent that by using the procedure here described it is possible to complete the master male model and a female reproduction thereof within a matter of weeks from the time the clay styling model is released. This master model and the female reproduction can then be released to appropriate departments for manufacture of the tools and fixtures necessary for manufacture of the draw-die panels. By doing in a matter of weeks what has heretofore required at least eighteen months, a tremendous saving in cost and time is achieved.

Having thus described the invention, I claim:

1. The method of making a master model from a styling dummy having bilaterally symmetrical parts comprising first making a female mold of said parts, then making a male duplication of said parts from said mold, reworking the surface area of one of said symmetrical parts to conform to a desired shape, making templates which conform to the reworked surface of said one part at spaced points therealong, cutting back any areas of the other of said symmetrical parts that are higher in elevation than the corresponding areas of said one part, removing said templates from said one part and mounting them in corresponding positions on and in identical relationship with respect to said other part and then conforming said other side to said one side using said templates as indexes, building up portions of said other part under the templates until such built-up portions conform exactly to the overlying confronting surfaces of the templates, and then building up the remaining areas of said other part to blend in with said built-up portions as required to make the surface of said other part a true opposite hand duplicate of said first part.

2. In the art of making an industrial model, the method of forming a master model of a part having bilaterally symmetrical surfaces comprising shaping said part from plastic, hardenable material so that it conforms generally to the desired final shape, forming one of said symmetrical surfaces accurately to said final shape using additional plastic material as required and leaving the other of said symmetrical surfaces unfinished, then making templates of said finished surface at spaced points therealong, repositioning the templates in corresponding positions above the unfinished surface and in identical relationship with respect to the unfinished portion of said other part removing any material necessary to so position the templates, building up the unfinished surface under said templates with plastic material until the built-up portions of said surface mate exactly with the confronting undersurfaces of the templates to produce a plurality of raised ridges having top surfaces which conform exactly to corresponding portions of said finished surface, then removing said templates and building up the remaining portions of said unfinished surface with plastic material using the finished top surfaces of said ridges as indexes until such remaining portions conform to corresponding portions of said finished surface.

3. In the art of making industrial models, the method of forming a master model of a part having bilaterally symmetrical surfaces comprising shaping said part from plastic, hardenable material so that it conforms generally to the desired final shape, then forming one of said symmetrical surfaces accurately to the final shape using additional plastic material as required and leaving the other of said surfaces unfinished, making templates on the finished surface at the intersections of respective spaced planes through said part and intersecting said surface, repositioning the templates in corresponding positions above the unfinished surface and in identical relationship with respect to the unfinished portion of said part removing any material necessary to so position the templates, building up the unfinished surface under said templates with plastic material until the built-up portions of said surfaces mate exactly with the confronting undersurfaces of the templates to produce a plurality of ridges having finished top surfaces which conform exactly to the corresponding portions of said finished surface, and then building up the portions of said unfinished surface between said ridges with plastic material as required to conform such surfaces to corresponding portions of said finished surface.

4. In the art of making industrial models, the method of forming a master model of a part having bilaterally symmetrical surfaces comprising building up and shaping said part so that it conforms generally to the desired final shape, then forming one of said symmetrical surfaces accurately to said final shape leaving the other of said surfaces unfinished, then making templates of said finished surface at spaced points therealong, repositioning the templates in corresponding positions above the unfinished surface and in identical relationship with respect to the part removing any material from the part necessary to so position the templates, building up the unfinished surface under said templates until the built-up portions of said surface mate exactly with the confronting undersurfaces of the templates to produce a plurality of raised ridges having top surfaces which conform exactly with corresponding portions of said finished surface, and then building up the remaining portions of said unfinished surface using the finished top surfaces of said ridges as indexes until such remaining portions conform to corresponding portions of said finished surface.

5. In the art of making industrial models, the method of forming a master model of a part having bilaterally symmetrical surfaces from a styling model comprising making a female reproduction of such part from the styling model, forming a male duplication of said part from said female reproduction, then forming one symmetrical surface of said male reproduction accurately to said final shape leaving the other symmetrical surface thereof unfinished, then making templates of said finished surface at spaced points therealong, repositioning the templates in corresponding positions above the unfinished surface and in identical relationship with respect to the unfinished portion of said part removing from the part any material necessary to so position the templates, building up the unfinished surface under said templates until the built-up portions of said surface mate exactly with the confronting undersurfaces of the templates to produce a plurality of raised ridges having top surfaces which conform exactly with corresponding portions of said finished surface, and then building up the portions of said unfinished surface between said ridges as required to conform such surfaces to corresponding portions of said finished surface.

6. In the art of making industrial models, the method of forming a master model of a part having bilaterally symmetrical surfaces from a clay styling model comprising making a female plaster mold of said part from said styling model, casting a plastic male duplication of said part from said female plaster mold, then forming one symmetrical surface of said duplication accurately to said final shape using additional plastic material as required and leaving the other symmetrical surface of the duplication unfinished, making templates of the finished surface at the intersections of respective spaced planes through said duplication and intersecting said surface, repositioning the templates in corresponding positions above the unfinished surface of the duplication and in identical relationship with respect to the unfinished portion thereof removing any material necessary to so position the templates, building up the unfinished surface under said templates with plastic material until the built-up portions of said surface mate exactly with the confronting undersurfaces of the templates to produce a plurality of raised ridges having top surfaces which conform exactly with corresponding portions of said finished surface, and then building up the remaining portions of said unfinished surface with plastic material using the finished top surfaces of said ridges as indexes until such remaining portions conform to corresponding portions of said finished surface.

7. In the art of making industrial models, the method of forming from a styling model a master model having bilaterally symmetrical surfaces and a female reproduction thereof, which master model and female reproduction are useful in the fabrication of tools and fixtures comprising first forming a female mold from said styling model, then in one sequence of steps making a male cast from said female mold, fabricating a reinforcing framework which conforms generally on at least one side thereof to said cast, then in a second sequence of steps making a cast of plastic material from said female mold, reforming one symmetrical surface only of said cast accurately to a desired final shape using plastic material as required, then conforming the unfinished surface of said plastic cast to said finished surface cutting away the material from said surface and using additional plastic material as required to produce a finished master model, then mounting the framework produced by the first sequence of steps above and spaced from the finished surface of said master model, and casting plastic material against the finished surface of said master model with the framework fastened securely to the plastic material to produce a female mold of said master model.

8. In the art of making industrial models, the method of making a master model and a female reproduction thereof for use in the fabrication of tools and fixtures from a styling model which conforms at least approximately to the desired final shape of the master model, said method comprising making a female mold of said part, then in one sequence of steps making a male cast from said female mold, fabricating a lattice framework having a side which conforms at least generally to the reproduced surface of said cast, then as a second sequence of steps casting a plastic male model duplication from said female mold, reforming the surface of said plastic duplication to conform to a desired final model shape, cutting away plastic material from said duplicatoin and using additional plastic material as required to produce a finished master model, then superimposing the lattice framework produced as a result of said first sequence of steps above and spaced from the finished surface of said master model, and then casting plastic material against the finished surface of said master model with the framework fastened securely to the plastic material to produce a female mold of said master model.

9. The method of making from a preliminary model a master model having bilaterally symmetrical halves and wherein only one of said halves is finished to a final desired form, said method comprising making templates of said finished half at spaced points therealong, repositioning the templates in corresponding positions above the unfinished half and in identical relationship with respect thereto, building up the unfinished surface under said templates until the built-up portions of said surface mate exactly with the confronting undersurfaces of the templates to produce a plurality of raised ridges having top surfaces which conform exactly with corresponding portions of said finished surface, and then building up the portions of said unfinished surface between said ridges as required to conform such surface to corresponding portions of said finished surface.

10. The method of making a master model having bilaterally symmetrical parts from a styling dummy comprising first making a female mold of said parts, then making a male duplication of said parts from said mold, reworking the surface area of one of said symmetrical parts to conform to a desired shape, making templates which conform to the reworked surface of said one part at spaced points therealong, cutting back any areas of the other symmetrical part that are higher in elevation than the corresponding areas of said one part, removing said templates from said one part and mounting them in corresponding positions on and in identical relationship with respect to said other part and then conforming said other part to said one part using said templates as indexes.

11. The method of making a master model from a styling dummy having opposite parts formed with bilaterally symmetrical surfaces comprising first making a female mold of at least one of said parts so as to negatively reproduce the bilaterally symmetrical surface of the part in said mold, then making a male duplication of said one part from said mold so as to reproduce in positive form the mentioned surface of said part, reworking the reproduced symmetrical surface of said duplication to a desired shape, making profile templates which conform to the reworked surface of said male duplication at spaced points therealong, repositioning said templates on a similarly prepared male duplication of the other of said parts in corresponding positions and in identical relationship with respect to the bilaterally symmetrical surface of said other part, building up portions of said other part under the templates until such built-up portions conform exactly to the overlying confronting surfaces of the templates, and then building up the surface areas of said other part between and adjacent to said built-up portions until the mentioned areas blend in with said built-up portions and the bilaterally symmetrical surface of said other part is a true opposite hand duplicate of said first part.

12. The method of making a master model from a styling dummy having opposite parts formed with bilaterally symmetrical surfaces comprising first making a female mold of at least one of said parts so as to negatively reproduce the bilaterally symmetrical surface of the part in said mold, then making a male duplication of said one part from said mold so as to reproduce in positive form the mentioned surface of said part, reworking the reproduced symmetrical surface of said duplication to a desired shape, making profile templates which conform to the reworked surface of said male duplication at spaced points therealong, repositioning said templates on a similarly prepared male duplication of the other of said parts in corresponding positions and in identical relationship with respect to the bilaterally symmetrical surface of said other part, and then conforming the bilaterally symmetrical surface of said other part to the corresponding surface of said first part using said templates as indexes.

13. The method of making a master model from a styling dummy and conventional body drafts prepared from said dummy comprising the steps of making a female mold of a selected surface area of said styling dummy so that the mold reproduces said surface area in negative form, then making a male duplication of the surface area from said mold, preparing templates of joint and high-light lines peculiar to said surface from body drafts, mounting said templates above the mentioned surface of said male duplication in predetermined relation to said surface and conforming the portions of said surface directly under the templates to said templates, and then reworking the rest of said surface to a predetermined form using the portions defined by said templates as indexes.

STEVEN P. KISH.

References Cited in the file of this patent

UNITED STATES PATENTS

| Number | Name | Date |
| --- | --- | --- |
| 1,776,622 | Errington et al. | Sept. 23, 1930 |
| 2,120,987 | Murray | June 21, 1938 |
| 2,363,213 | Wallace | Nov. 21, 1944 |
| 2,447,620 | Singleton et al. | Aug. 24, 1948 |
| 2,459,084 | McGary et al. | Jan. 11, 1949 |
| 2,460,242 | Renaud | Jan. 25, 1949 |
| 2,466,272 | Porter et al. | Apr. 5, 1949 |
| 2,516,091 | Renaud | July 18, 1950 |

OTHER REFERENCES

Plastics, "Plastic Dies Speed Aircraft Production," by Tompkins, June 1944, pages 58, 60, 62 and 64.

American Machinist, "Jigs and Dies from Cast Plastics," July 9, 1942, pages 731–737.